UNITED STATES PATENT OFFICE.

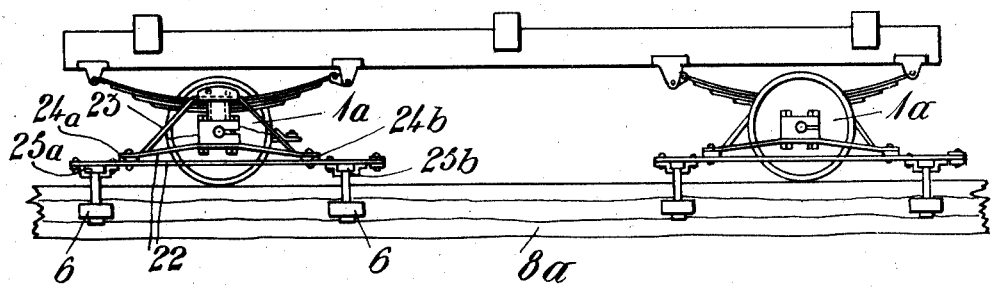
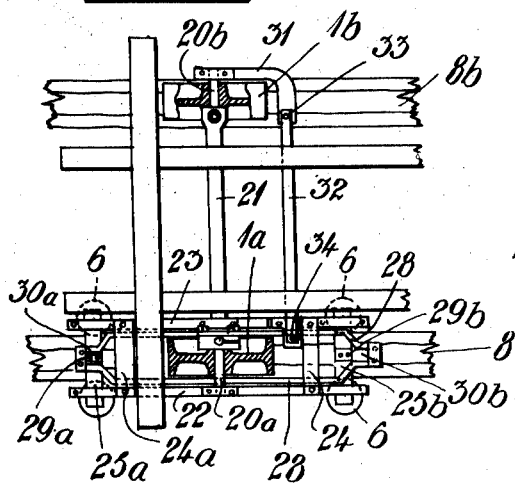
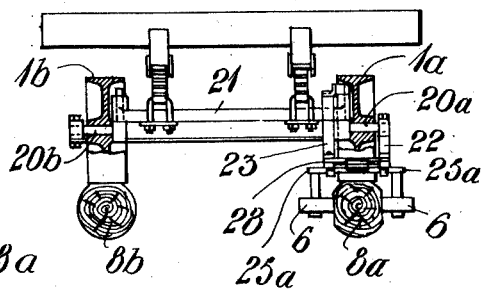

KLAS AUGUST WIDEGREN AND EMIL HENRIK WIDEGREN, OF HERSERUD, SWEDEN.

CONVEYING-TRUCK.

1,341,249.

Specification of Letters Patent.  Patented May 25, 1920.

Application filed February 5, 1919. Serial No. 275,267.

*To all whom it may concern:*

Be it known that we, KLAS AUGUST WIDEGREN and EMIL HENRIK WIDEGREN, subjects of the King of Sweden, (whose post-office addresses are Herserud, Sweden,) have invented new and useful Improvements in Conveying-Trucks, of which the following is a specification.

In conveying tracks erected entirely of timbers in such manner that the track rails consist of strings of timbers, the trucks are to be constructed in a special manner, in order that the traffic shall take place without disorders and with a desirable speed. Trucks provided with flanged wheels, as commonly used in rail roads, cable ways and the like, are unsuitable in such timber tracks, and likewise trucks having cylindrical carrying wheels journaled on stationary shafts and horizontal or obliquely placed guiding wheels preventing the derailing of the trucks, as proposed for certain purposes, are of little use for a track of the kind above-mentioned. Special difficulties are met with in the curves of a timber track. Such curves are generally constructed by so placing a row of straight timbers that the timbers form angles with each other, the center lines of the timbers thus forming an open polygon. Trucks having wheels of known construction do not afford a soft and even passage through the angles formed by the timbers.

This invention relates to a conveying truck adapted to the special circumstances occuring in a timber track of the kind aforementioned. The invention consists chiefly, in the combination of a truck frame, carrying wheels connected with said frame, bearing devices supporting said wheels and being swingable about a vertical pin, pairs of guiding wheels arranged in front of and behind said carrying wheels, and means for locking either of said pairs of guiding wheels in operative connection with a carrying wheel.

The invention is illustrated in the accompanying drawings in which—

Figure 1 is a side view,

Fig. 2 a plan view partially in section and

Fig. 3 a cross-section of a conveying truck constructed according to the invention.

Referring to the drawings, the carrying wheels are designated by $1^a$ and $1^b$ and have wide cylindrical bearing surfaces adapted to run on the corresponding rows of timbers $8^a$ and $8^b$. The carrying wheels are journaled on shafts $20^a$ and $20^b$ which, at the side facing the track, are bent upwardly at a right angle and journaled in the truck shaft 21. Rigidly connected with one of the wheel shafts, $20^a$, are systems of bars or frames 22, 23 interconnected by cross-bars $24^a$ and $24^b$. The bars 22, 23, $24^a$ and $24^b$ are united so as to form a rigid system or framework secured to the angularly bent wheel shaft $20^a$. Mounted in said framework are the laterally movable straps $25^a$ and $25^b$ carrying the guiding wheels 6, 6.

Inserted between the cross-bars $24^a$, $24^b$ and the straps $25^a$, $25^b$ is a frame 28 freely movable in the longitudinal direction of the truck. By the movement of the frame 28 in one direction or the other either strap $25^a$ or $25^b$ may be locked so as to be prevented from moving laterally. Said locking operation may be effected in various manners. In the embodiment shown each of the straps $25^a$ and $25^b$ is provided with a projection or lug $29^a$ and $29^b$ respectively fitting into a gap or interspace $30^a$ and $30^b$ respectively in the frame 28. On moving the frame 28 in one direction, one of the projections, for instance $29^a$, will engage the corresponding gap $30^a$, as shown in the drawing, and owing thereto the corresponding strap $25^a$ will be locked, while the other strap $25^b$ is free to move laterally. When moving the frame 28 in the opposite direction, the effect will be reversed.

For facilitating the locking of the straps $25^a$ and $25^b$ the frame 28 has oblique guiding surfaces on both sides of the gaps $30^a$ and $30^b$, which surfaces have the object to engage the lug $29^a$ or $29^b$ when the frame is moved, thus adjusting the strap to a middle position in which the lug can enter the gap.

As mentioned above, the wheel shafts $20^a$ at one side only of the truck are provided with such a reversing device. The wheel shafts $20^b$ at the other side of the truck are provided with a rigidly secured bar 31 connected by means of a rod 32 and pins 33 and 34 with the frame-work 22, 23, $24^a$, $24^b$.

The devices shown in Figs. 1 to 3 operate as follows.

If the truck is to be moved in one direction or the other, the strap $25^a$ or $25^b$ positioned in front of the carrying wheel, counted in the direction of movement, is locked by moving the frame 28 in the requisite direction. Then the wheels whose strap 25ª or 25ᵇ has been locked serve as guiding wheels for the carrying wheels 1ª. The other carrying wheel 1ᵇ is guided by the guiding wheels guiding the opposite carrying wheel 1ª, since the guiding movements are transmitted from each of the frame-works 22, 23, 24ª, 24ᵇ through the rod 32 to the carrying wheels 1ᵇ.

It is to be noted that the unlocked strap 25ª or 25ᵇ shall be capable of moving laterally so far as to prevent jamming of the guiding device, when passing an angle between two timbers. Above such movement of the strap 25ª or 25ᵇ a little movement only for the requisite play is to be allowed, and the movement is to be limited to that amount by any suitable stop. By such limiting of the lateral movement the advantage is obtained that the wheels being free at the moment and, consequently, not serving as guiding wheels, will prevent derailing. If from any reason the carrying wheel 1ª, on moving, should move laterally, it will be retained in front by the wheels 6 serving at the moment as guiding wheels, while behind the other free wheels 6 prevent the lateral movement from being so great, that the wheel 1ª (and at the same time the wheel 1ᵇ) runs risk of sliding off the row of timbers.

Obviously, the devices described above may be varied in many respects without deviating from the principles of the invention. Thus for instance, concerning the carrying wheels, each wheel need not be swingable about its own pin, it being possible to mount the wheels in such manner that two wheels are journaled on a common shaft movable about a vertical pin placed between the wheels and forming right angles with the shaft.

Concerning the guiding wheels modifications may be adopted. Instead of placing guiding wheels at both sides of one row of timbers, one of the wheels may bear against one row of timbers and the other wheel against the other row. The guiding operation may be effected by guiding wheels bearing against a separate row of timbers placed between or at the side of the rows of timbers carrying the trucks. Of course, in both cases the guiding wheels have to be connected with the corresponding carrying wheels swingable about a vertical pin. Finally, in wheels each of which is movable about a vertical pin a separate guiding device may be provided for each wheel without the cross-connection between the wheels belonging to one pair of wheels as shown in Figs. 1 to 3.

The denomination conveying truck refers to wagons as well as to tractors provided with motor.

We claim:—

1. A conveying truck, comprising a truck frame, carrying wheels connected with said truck frame, bearing devices supporting said wheels and being swingable about a vertical pin, pairs of guiding wheels arranged in front of and behind said carrying wheels, and means for locking either of said pairs of guiding wheels in operative connection with a carrying wheel.

2. A conveying truck comprising a truck frame, carrying wheels connected with said truck frame and having substantially cylindrical running surfaces, bearing devices supporting said wheels and each of them being swingable about a vertical pin, pairs of substantially horizontal guiding wheels arranged in front of and behind said carrying wheels and mounted movable in the cross-direction of the truck, and locking means for operatively connecting either of said pairs of guiding wheels with a carrying wheel.

3. A conveying truck comprising a truck frame, pairs of carrying wheels connected with said truck frame, bearing devices for each of said wheels, a vertical journal for each of said bearing devices, guiding wheels connected with one wheel of each pair of wheels, and links connecting the bearing devices of each pair of carrying wheels.

4. A conveying truck comprising a truck frame, pairs of carrying wheels connected with said truck frame, bearing devices supporting said wheels and each of them being swingable about a vertical pin, laterally movable straps carrying pairs of guiding wheels and arranged in front of and behind said carrying wheels, and locking means for operatively connecting either of said straps with a carrying wheel.

5. A conveying truck comprising a truck frame, pairs of carrying wheels connected with said truck frame and having substantially cylindrical surfaces, bearing devices supporting said wheels and each of them being swingable about a vertical pin, guiding wheels disposed at each side of a carrying wheel counted in the longitudinal direction of the truck, and means for setting said guiding wheels alternately out of and into operation.

6. A conveying truck comprising a truck frame, pairs of carrying wheels connected with said truck frame, bearing devices supporting said wheels and each of them being swingable about a vertical pin, pairs of guiding wheels disposed at each side of a carrying wheel counted in the longitudinal direction of the truck, a framework connected with said carrying wheel, straps supporting each pair of guiding wheels and adapted to move in the transverse direction of said framework, and means for alternately locking said straps to the framework.

7. A conveying truck comprising a truck frame, pairs of carrying wheels connected with said truck frame, bearing devices supporting said wheels and each of them being swingable about a vertical pin, pairs of guiding wheels disposed at each side of a carrying wheel counted in the longitudinal direction of the truck, a framework connected with said carrying wheels, straps supporting each pair of guiding wheels and adapted to move in the transverse direction of said framework, a frame movable in the longitudinal direction of the framework and adapted to alternately lock said straps to the framework.

8. A conveying truck, comprising a truck frame, carrying wheels connected with said truck frame, bearing devices supporting said wheels and being swingable about a vertical pin, a pair of guiding wheels disposed at each side of a carrying wheel counted in the longitudinal direction of the truck, and means for alternately adjusting said pairs of guiding wheels to an operative position in relation to the carrying wheel and locking them in said position.

In testimony whereof we have signed our names.

KLAS AUGUST WIDEGREN.
EMIL HENRIK WIDEGREN.